Patented Nov. 14, 1922.

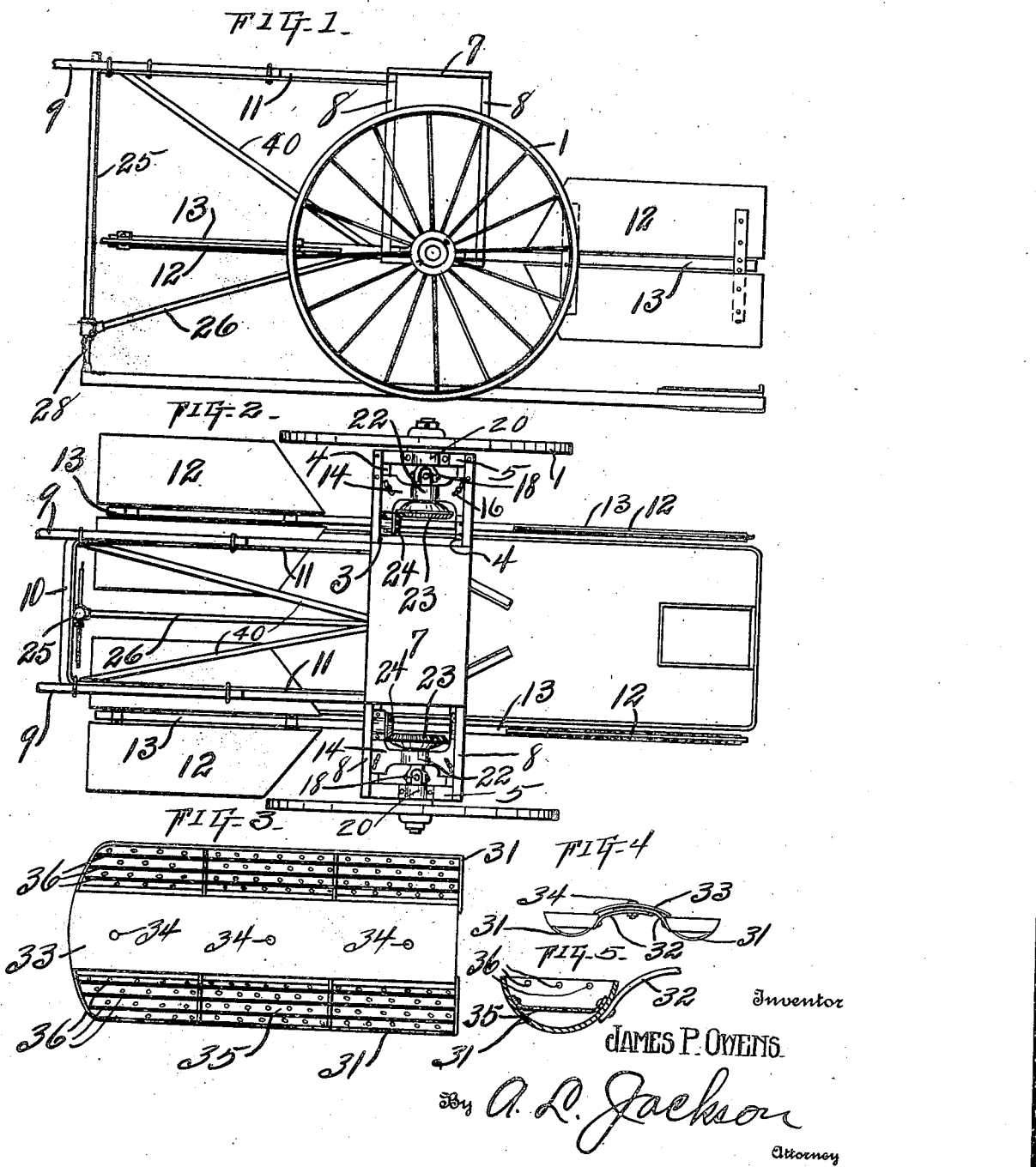

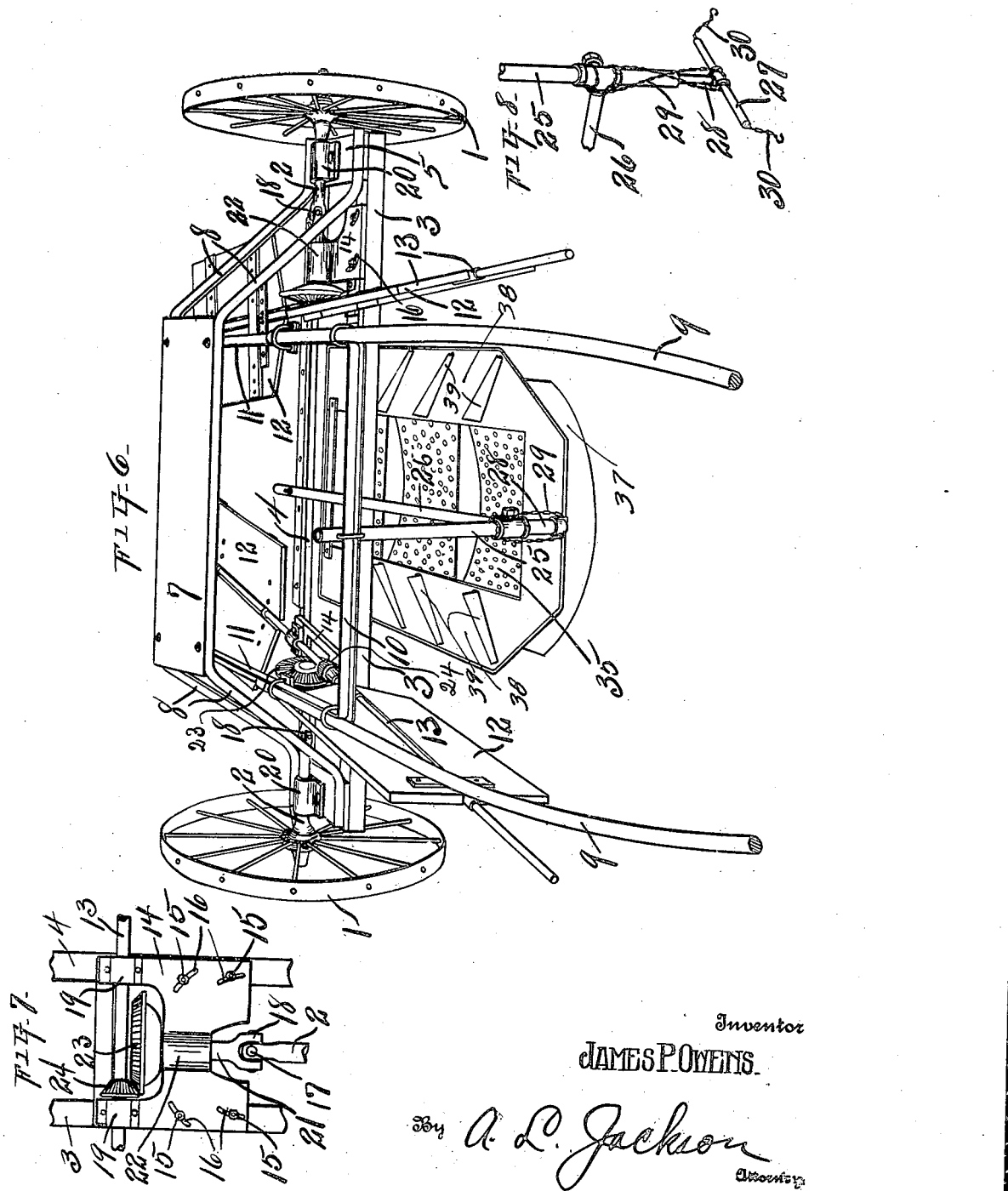

1,435,656

UNITED STATES PATENT OFFICE.

JAMES P. OWENS, OF WEATHERFORD, TEXAS.

INSECT DESTROYER.

Application filed March 11, 1922. Serial No. 542,895.

*To all whom it may concern:*

Be it known that I, JAMES P. OWENS, citizen of the United States, residing at Weatherford, in the county of Parker and State of Texas, have invented certain new and useful Improvements in Insect Destroyers, of which the following is a specification.

My invention relates to insect destroyers and more particularly to wheeled trucks for destroying insects which infest growing plants; and the object is to provide a machine for catching and burning insects that may be found on growing plants and particularly for destroying boll weevils which prevent the fruiting of cotton by destroying the squares and small bolls. The machine will also destroy the worms which eat the leaves of the cotton and other parts of the cotton, and in fact, the machine will destroy all insects that may be found on the growing plants, and another valuable feature of the machine is that a consuming fire is provided in an incinerator which will consume the insects and also the squares and small bolls in which boll weevils are lodged. The incinerator will also destroy insects which have fallen on the ground. Other objects and advantages will be fully described in the following description and the invention will be more particularly pointed out in the claims.

Reference is had to the accompanying drawings which form a part of this application.

Fig. 1 is a side elevation of the insect destroyer. Fig. 2 is a plan view of the same. Fig. 3 is a detail view of the incinerator, being a plan view. Fig. 4 is an end view of the incinerator. Fig. 5 is an enlarged vertical cross-section of one member of the incinerator. Fig. 6 is a perspective view of the insect destroyer, showing a variation in the incinerator. Fig. 7 is a detail plan view of the universal coupling and the adjustable bearing for the agitator shaft. Fig. 8 is a detail view of the hanger for the agitator shaft.

Similar characters of reference are used to indicate the same parts throughout the several views.

The destroyer is provided with supporting wheels 1 and the truck is supported on the wheels 1 by stub shafts 2. Two frame pieces 3 and 4 support the machine between the wheels 1. Bearing bars 5 are attached to the angle iron frame pieces 3 and 4 and constitute a part of the frame of the machine, making a quadrangular frame with the angle bars 3 and 4. Bearings 20 for the stub shafts 2 are mounted on the bearing bars 5. A seat 7 is provided and angle bars 8 are attached to the seat 7 and then bent downwardly and attached to the bearing bars 5. The truck may be drawn by a single animal. For this purpose shafts 9 are provided. An angle iron support for the shafts 9 consists of a cross bar 10 on the front part of the machine which has side bars 11 bent at right angles to the member 10 and extended back under the seat 7 and bolted thereto. The cross bar 10 is provided with braces 40 extended to the frame member 3. The shafts 9 are attached to the side bars 11.

The stub shafts 2 drive the agitators 12. The agitators 12 are carried by shafts 13 and the shafts 13 are driven from the stub shafts 2. Bearing yokes 14 are mounted adjustably on the angle frame members 3 and 4. Bolts 15 are used to attach the yokes 14 to the frame members 3 and 4. The yokes 14 have slots 16 so that the yokes may be set at different angles relative to the forward drive so that the agitators may be set at different angles relative to the rows of cotton. The forward ends of the shafts 13 should be generally further apart than the rear ends in order to incline cotton stalks towards the "middles" of the rows, that is, the space between the rows of stalks. This is necessary in most cases to bring the stalks far enough over the incinerators so that when the insects fall from the growing plants, the insects will fall into or on the incinerators. The bolts 15 are stationary in the frame members 3 and 4 and the angle of the yokes may be changed by loosening the bolts 15 and then swinging or turning the yokes with the pivot bolts 17 of the universal couplings 18 as the center of rotation. The shafts 13 are journaled in bearings 19 which are attached to the yokes 14.

The driving is accomplished by the power from the supporting wheels 1. The shafts 2 of the wheels 1 are journaled in bearings 20 which are carried by the bearing bars 5. The coupling shafts 21 are connected to the shafts 2 by the universal couplings or joints 18. The coupling shafts 21 are journaled in bearings 22 which are carried by the yokes 14. The coupling shafts 21 carry beveled cog wheels 23 and these cog wheels mesh with and drive beveled pinions 24 which are rigid with the agitator shafts 13. By reason of the universal couplings 18, the agitator shafts 13 may be turned to any required angle without interfering with the driving of the agitator shafts 13. The driving of the agitators is thus accomplished from the supporting wheels and they may be driven faster or slower according to the speed of the wheeled truck. The agitators 12 are relatively long so that no stalks of cotton will be missed.

The insects are caught in incinerators and completely consumed during operation. Incinerators of different forms are provided for the reason that contour of the ground between the rows of cotton is not always the same. The space between the rows of plants is generally called the "middle" of the row. During the cultivation period, there are small ridges of dirt midway between the rows of plants and these ridges of dirt are called "middles." During the cultivation period, the form of incinerator shown in Figs. 3, 4, and 5 is used, but when the "middles" are broken out at the end of the cultivation period, the form of incinerator shown in Fig. 6 will be used. The object always is to have the incinerator drag along on all parts of the earth between the rows of plants in order to kill any insects that may fall on the ground.

The incinerator is loosely connected to the front part of the truck frame by means of an upright 25 which is attached to the U-shaped frame consisting of the cross bar 10 and arms 11. The upright 25 is provided with a brace 26 which is attached to the angle bar frame member 4 and to the upright 25. The upright 25 and the brace 26 are thus rigid with the frame of the truck. The incinerator is loosely connected to the upright 25 and brace 26. These elements may be made of pipe. A yoke 27 having an upright 28 at right angles thereto is operatively and loosely connected to the upright 25 and brace 26. The upright member 28 telescopes into the upright 25. An endless chain 29 is placed about the upright 25 and brace 26 and around the yoke 27. The yoke 27 cannot go lower down than the chain 29 will permit, but the yoke 27 may go higher or closer to the upright 25 by reason of the fact that the telescoping upright 28 moves freely in the upright 25. The object of this construction is to compensate for the unevenness of the ground over which the incinerator is being dragged by the yoke 27, and also to compensate for the different heights the bar 10 may be raised or lowered. The incinerator will thus drag along on the ground at all times. The incinerator is attached to the ends of the yoke 27 by chains 30.

The incinerator is particularly adapted for maintaining a fire with charcoal as a fuel. The form of incinerator, shown in Figs. 3, 4, and 5, has two metallic receptacles 31 connected by a metallic slab or sheet of metal 32 for each receptacle which are connected to a common slab 33, the connecting slabs 32 being lapped one upon the other more or less according to the widths of the "middles" which they are to span. These slabs or cleats 32 are clamped to the holder 33 by bolts 34. Each member of the incinerator has a perforated grate 35 to admit air and through which ashes may fall. The incinerators are also provided with strands of wire 36 which serve as a screen to keep larger objects from falling into the incinerator. A charcoal fire is maintained in the incinerators during operation. The charcoal fire is different from other fuel fires in that the fire is a consuming fire without blazing to any considerable extent. The fire will consume all insects instantly and there is scarcely anything left in the form of ashes. The squares and small bolls that fall from the cotton will also be completely consumed by the fire. Many boll weevils are in the squares and small bolls. The insects that fall to the ground will also be killed by the heat of the incinerators. The incinerator shown in Fig. 6 is similar in construction but has only one grate 35. The incinerator shown in Fig. 6 has a furnace 37 and grate 35 and inclined side members 38 and deflectors 39 on the members 38 to throw insects and bolls and squares from the inclined members 38 onto the grate 35.

The arrangement of the blades 12 on the agitator shafts obtains the advantage of a double stroke or alternating stroke of double power. The advantage of this arrangement is that there is a more thorough knocking of the insects from the stalks or growing plants.

Advantage is taken of the characteristic of boll weevils to sulk when they are disturbed. They fold up their legs and wings and will not move until they have been left undisturbed for periods of time.

What I claim, is:—

1. An insect destroyer comprising a wheeled truck having supporting wheels provided with stub shafts, a frame and bearings on said frame for said shafts, agitators, and means for revolving said agitators consisting of adjustable coupling shafts and universal couplings connecting said coupling shafts to said stub shafts and gearing operatively connecting said coupling shafts to said agitators.

2. An insect destroyer comprising a wheeled truck having supporting wheels provided with stub shafts, a frame and bearings on said frame for said shafts, yokes adjustably mounted on said frame, revoluble agitators and shafts therefor journaled on said yokes, coupling shafts journaled on said yokes and universal couplings connecting said coupling shafts to said stub shafts, and gearing for driving said agitator shafts from said coupling shafts.

3. An insect destroyer comprising a wheeled truck having supporting wheels provided with stub shafts driven by said wheels, a frame and bearings on said frame for said shafts, yokes adjustably mounted on said frame, agitator shafts journaled on said yoke and agitator shafts mounted on said blades and set at angles to each other, coupling shafts journaled on said yokes and universal couplings connecting said coupling shafts to said stub shafts, and gearing for driving said agitator shafts from said coupling shafts.

4. In an insect destroying machine provided with a wheeled truck and a receptacle for collecting insects, bolls and squares; supporting wheels for said truck provided with stub shafts, a frame and bearings on said frame for said shafts, agitators for brushing insects, squares and bolls from growing plants into said receptacle, means for revolving said agitators consisting of adjustable coupling shafts, universal couplings connecting said coupling shafts to said stub shafts, and gearing operatively connecting said coupling shafts to said agitators.

In testimony whereof, I set my hand, this 27th day of February, 1922.

JAMES P. OWENS.